Nov. 9, 1965  J. J. PARKER ETAL  3,216,733
COLLET CHUCK
Filed Jan. 28, 1964  2 Sheets-Sheet 1
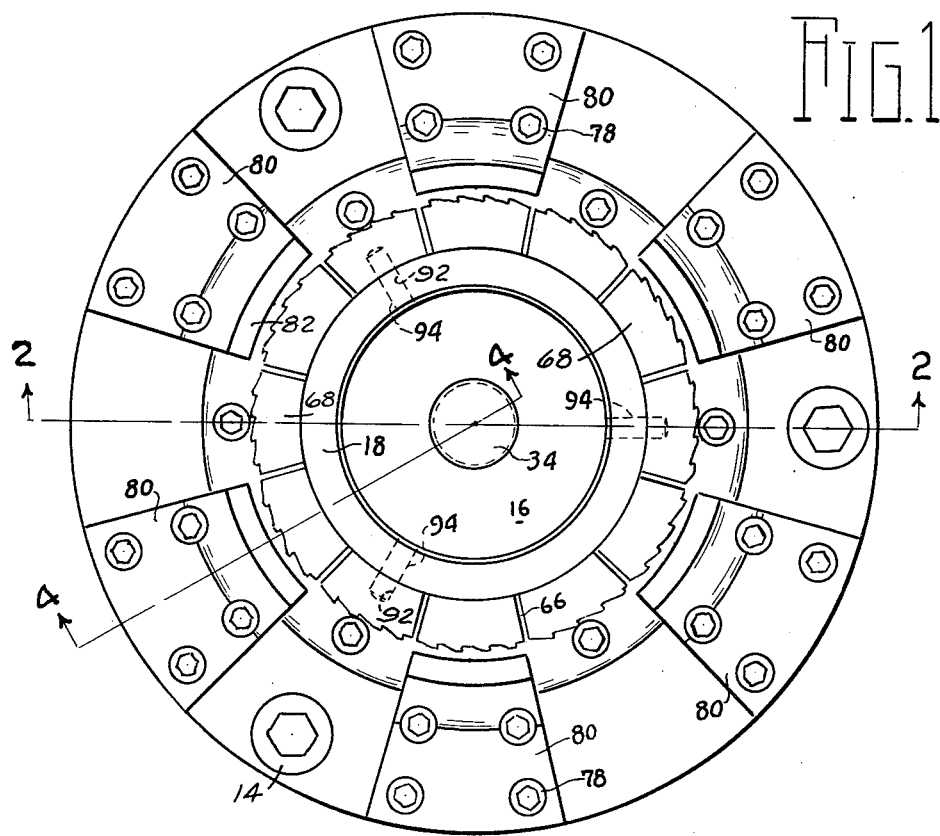
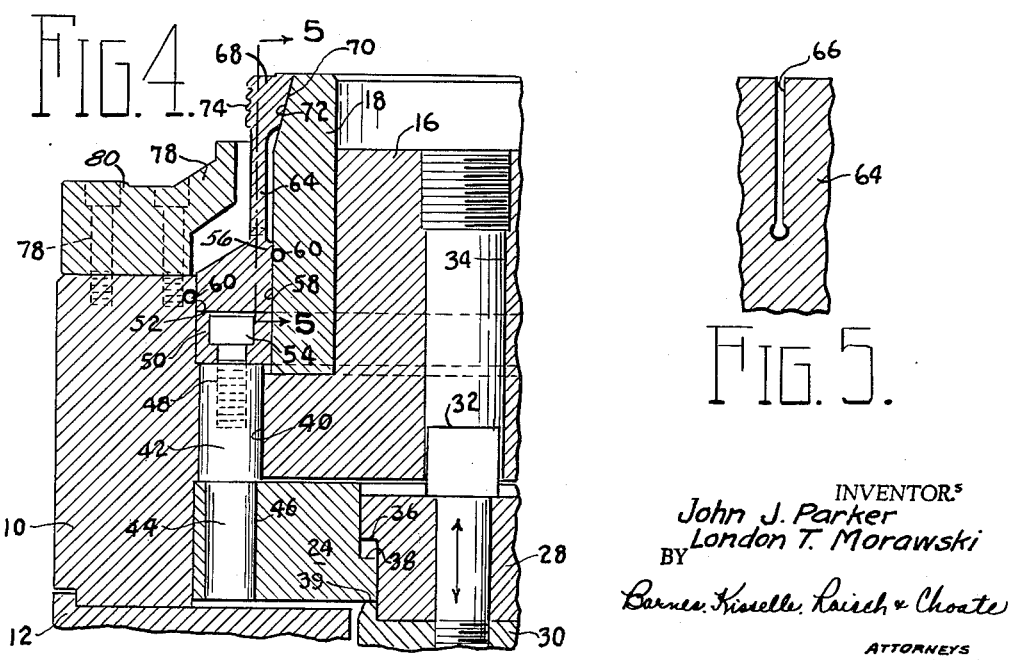
INVENTORS
John J. Parker
London T. Morawski
BY
Barnes, Kisselle, Raisch & Choate
ATTORNEYS Nov. 9, 1965  J. J. PARKER ETAL  3,216,733
COLLET CHUCK
Filed Jan. 28, 1964  2 Sheets-Sheet 2
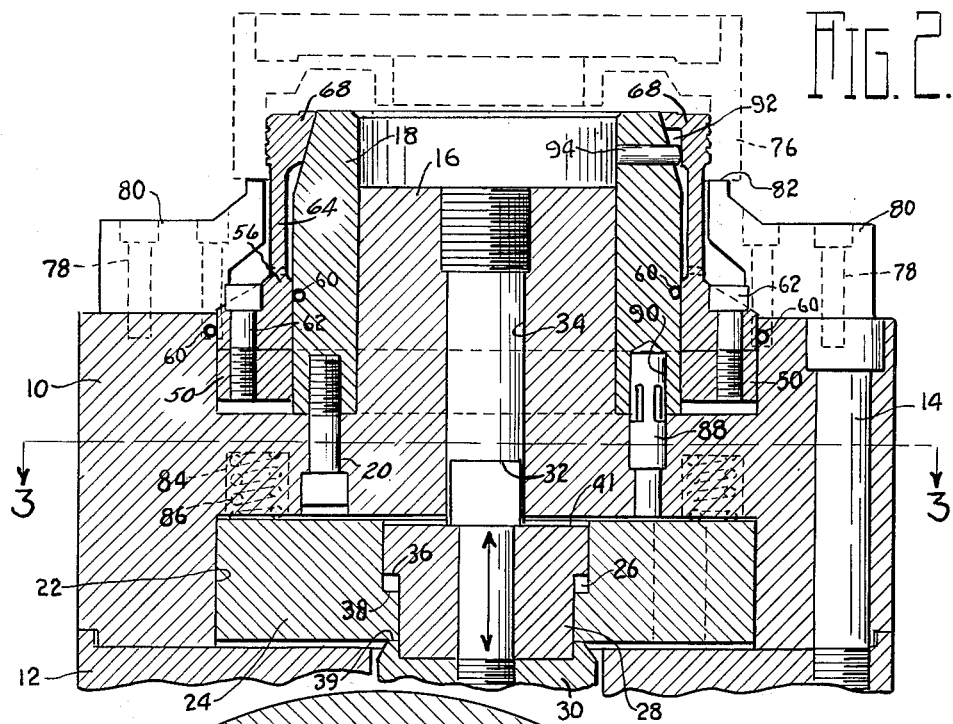
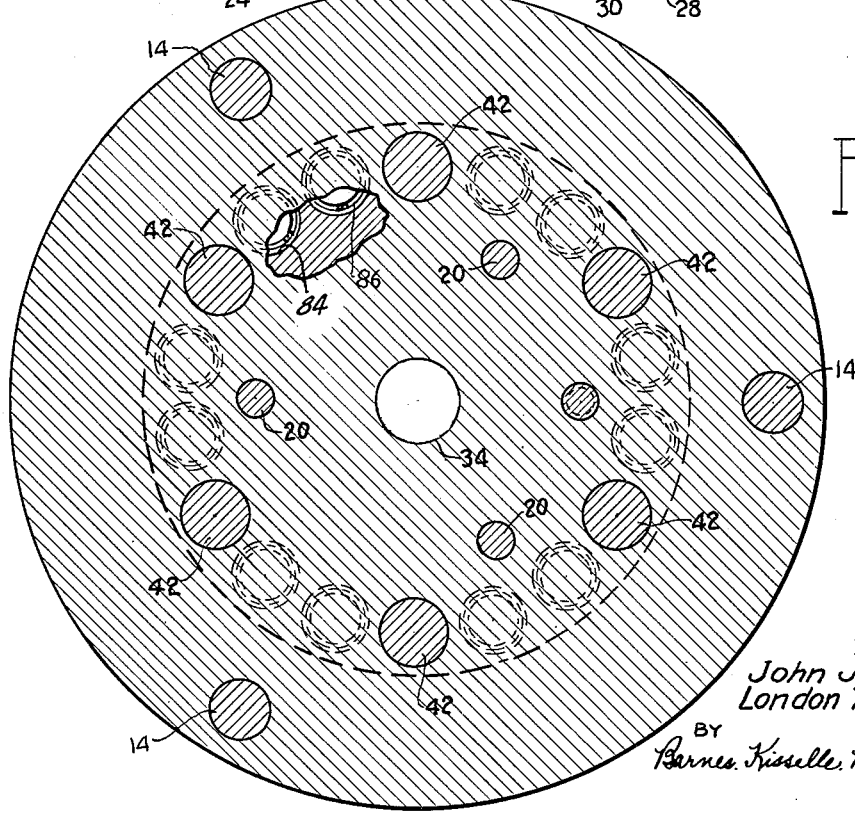
INVENTORS
John J. Parker
London T. Morawski
BY
Barnes, Kisselle, Raisch & Choate
ATTORNEYS

United States Patent Office 3,216,733
Patented Nov. 9, 1965

3,216,733
COLLET CHUCK
John J. Parker and London T. Morawski, Detroit, Mich.
(both of 1148 E. Nine Mile Road, Van Dyke, Mich.)
Filed Jan. 28, 1964, Ser. No. 340,682
13 Claims. (Cl. 279—2)

This invention relates to a collet chuck.

It is the object of this invention to provide a collet chuck that is very rigid in its construction, not susceptible to fractures, and, therefore, extremely suitable for gripping heavy work pieces, and particularly suitable for rough machining operations involving or requiring removal of a large amount of stock in one pass of the cutting tool.

Other features and objects of the invention will become apparent from the following description and drawings in which:

FIG. 1 is an elevational view of a chuck embodying the present invention.

FIG. 2 is a sectional view along the line 2—2 in FIG. 1.

FIG. 3 is a sectional view with parts broken away along the line 3—3 in FIG. 2.

FIG. 4 is a fragmentary sectional view along the line 4—4 in FIG. 1.

FIG. 5 is a fragmentary sectional view along the line 5—5 in FIG. 4.

Referring to the drawings, the chuck of this invention includes a body 10, which is adapted to be secured to the spindle 12 of a machine tool, such as a lathe or milling machine, by a plurality of screws 14, which extend through body 10 and are threaded into spindle 12. Body 10 includes a central cylindrical boss 16, around which is closely fitted a wear ring 18. It will be observed from the drawings, particularly FIG. 2, that wear ring 18 comprises a sleeve of relatively heavy construction and is rigidly secured to body 10 by screws 20. On the backside thereof, body 10 is provided with a counterbore 22 which slidably receives a pull-back ring 24. Ring 24 is in turn provided with a central counterbore 26, in which is slidably arranged a coupling 28. Coupling 28 is solidly connected to a drawbar 30 by a screw 32, the head of which is received in the central bore 34 in boss 16. Means not illustrated are provided for actuating drawbar 30 axially. Coupling 28 is formed with an annular shoulder 36, which when the drawbar 30 is shifted rearwardly (downwardly as viewed in FIG. 2) is adapted to engage shoulder 38 of counterbore 26 to shift pull-back ring 24 rearwardly. It will be observed that when drawbar 30 is shifted axially in a forward direction the leading end of the drawbar engages ring 24 at 39 before face 41 of coupling 28 engages the bottom of counterbore 22.

Referring now particularly to FIGS. 3 and 4, it will be noted that body 10 is provided with a series of bores 40, the axes of which lie on a circle spaced radially outward from the wear ring 18. Bores 40 open at their rear ends into counterbore 22. Within each bore 40 there is disposed a pin or peg 42 having a reduced rear end portion 44, which is brazed or otherwise suitably rigidly secured to pull-back ring 24 within bores 46 therein. The larger diameter portion of pegs 42, that is, the cylindrical portion 48, has a close sliding fit with bores 40. A ring 50 slidably fitted in the bore 52 of body 10 is secured to the forward ends of pegs 42 by screws 54. A collet member 56 is also slidably arranged within bore 52. The inner cylindrical surfaces of collet 56 and ring 50 slidably engage the outer cylindrical surface of wear ring 18. O-rings 60 seal the inner and outer sliding surfaces of collet member 56. Collet member 56 is in turn secured to ring 50 by screws 62 (FIG. 2).

It will be observed from the drawings that the inner end of collet member 56 is a relatively heavy section, having substantially the same inner and outer diameters as ring 50. However, the forward end portion of collet member 56 is formed as a thinner sleeve portion 64, which is axially slotted around its circumference as at 66. Slots 66 divide the forward end portion of collet member 56 into a plurality of circumferentially spaced gripping fingers 68. At their extreme forward ends, fingers 68 are formed with a conical inner surface 70, which conforms to and engages with the conical surface 72 at the forward end of wear ring 18. Around their outer periphery, fingers 68 are formed with serrations or gripping teeth 74 for gripping work piece 76, such as designated by broken lines in FIG. 2.

There is also mounted on the front face of body 10 around the collet member 56, as by screws 78, a plurality of stop members 80, which as indicated in FIG. 2 are adapted to engage one end face of the work piece 76 to properly locate the work piece axially on the chuck. In the arrangement illustrated, the stop members 80 have accurately machined end faces 82, which form locating surfaces against which the work piece 76 abuts so that its central axis will be coaxial with the chuck.

Referring to FIGS. 2 and 3, it will be observed that body 10 is formed with a plurality of cylindrical sockets 84, which open rearwardly into counterbore 22. These sockets retain compression springs 86, which bear against the forward face of the pull-back ring 24. The function of these springs will be described in connection with the description of the operation of the chuck. There is also arranged in body 10 a locating pin 88, which projects into a cylindrical socket 90 in wear ring 18, for facilitating assembly of the wear ring and collet member 56 on body 10 of the socket.

Referring to FIGS. 1 and 2, three of the fingers of the collet member 56 are formed with keyways 92 on the inner surface thereof and adjacent their forward ends. Keyways 92 are uniformly spaced apart circumferentially. Drive pins 94 extending transversely through wear ring 18 adjacent the nose thereof have a close fit with slots 92 and provide a driving connection between the wear ring and the collet member adjacent the forward end of the collet member.

The chuck is illustrated in the drawings in the released position; that is, drawbar 30 is illustrated in its axially forwardmost position. With the parts in this position, the forward end of the drawbar is contacting the rear face of pull-back ring 24, as at 39, and springs 86 are in the compressed condition. The fingers of collet member 56 are likewise shifted to the forwardmost position and in this position the outermost edges of the serrations or teeth 74 define a cylindrical surface which has a diameter only slightly less than the inner diameter of the work piece 76, which is to be gripped. With the chuck in this condition, the work piece 76 is positioned over the collet member with the end surface of the work piece engaging the stop faces 82 of the stop members 80. Thereafter the drawbar 30 is retracted. As the drawbar is retracted, the shoulder 36 on coupling 28 engages shoulder 38 of the pull-back-ring 24 to shift the pull-back ring axially in a rearward direction. Since the collet member 56 is solidly connected to the pull-back ring 24 through the screws 62, ring 50, screws 54 and pins 42, the gripping fingers 68 of the collet 56 shift radially outwardly at their free ends by reason of the taper 72 and thus firmly gripping the work piece.

The chuck thus presents a very rigid structure and the work piece, when gripped as illustrated, behaves as a unitary part of the chuck structure. For this reason it is possible to take very heavy cuts on the work piece, as much as ⅜ of an inch on a side, and there is absolutely no swaying of the work piece or flexing of the chuck structure. It will further be noted that with the present arrangement, particularly the use of the safety compression springs 86, if the work piece 76 should be initially positioned on the collet 56 in a slightly cocked position, when the cut is initiated the force of the cutting tool would have a tendency to uncock the work piece, in which case compression springs 86 will immediately retract the collet member and rigidly clamp the work piece in the straightened position. Furthermore, it will be noted that as the collet fingers 68 are expanded into engagement with the work piece, the work piece is drawn tightly against the stop surfaces of the stop members 80 to insure proper alignment of the work piece on the chuck.

As the chuck is rotated, a rotating drive connection between the body of the chuck and the collet member 56 is provided by the screws 62, which are threaded into ring 50, and which in turn is connected to the pins 42, by the screws 54. However, in view of the fact that the fingers 68 are of a reduced cross-section, the use of the drive pins 94 having a driving relationship with the collet fingers adjacent their forward end, prevents the fingers from flexing circumferentially due to the driving torque of the chuck.

Although the actuating means for the collet in the embodiment illustrated herein is in the form of a mechanically actuated drawbar, it will be appreciated that the collet can be actuated axially by other means which are conventional in this art, such as by pneumatic or hydraulic pressure. In the case of pneumatic or hydraulic pressure, the pull-back ring 24 would be connected to a piston rod instead of a mechanically actuated drawbar, or the pull-back ring itself could serve as a piston and the bore 22 as a cylinder in which the piston operates.

We claim:

1. A collet chuck comprising a body having means thereon forming an axially extending central, cylindrical boss at one end, and a large rdiameter central bore at its opposite end, said body also having a plurality of circumferentially spaced and axially extending through bores therein which open at one end around said central boss and at their opposite ends into said central bore, a collet member mounted for axial sliding movement on and concentrically with said boss, a collet pull-back member axially slidable in said bore, a plurality of pins extending through said circumferentially spaced bores and connected at one end to said collet member and at the opposite ends to said pull-back member, the free end portion of the collet being axially slotted to form a plurality of spring gripping fingers, means on said boss for flexing said spring gripping fingers radially outwardly when the collet is shifted axially in one direction and means associated with said pull-back member for shifting the pull-back member axially within said bore to thereby expand and contract the collet member.

2. A chuck as called for in claim 1, wherein said means for expanding the collet comprises a sleeve having a close fit around said boss, said sleeve having a tapered nose at its forward end, said collet member being slidably mounted on said sleeve and the axially outer end of the collet member being arranged to engage the tapered nose of said sleeve.

3. A collet chuck as called for in claim 1, wherein said pull-back member comprises a ring and wherein said last mentioned means comprises a coupling operably connected with said ring and adapted to be connected to a drawbar.

4. A collet chuck as called for in claim 3, wherein said ring has a central bore therein provided with an annular shoulder, said coupling member being slidably arranged within the bore of said ring and being provided with a shoulder adapted to engage the shoulder in the bore of said ring to retract the collet member when the coupling is shifted axially in one direction.

5. A collet chuck as called for in claim 1, including a plurality of drive pins connecting said central boss with said spring fingers adjacent the free ends thereof for providing a driving torque to said free ends when the body is rotated.

6. A collet chuck as called for in claim 5, wherein said drive pins extend radially outwardly and said spring fingers have axially extending slots on the inside thereof with which said drive pins have a close driving fit.

7. A collet chuck comprising a body having a means thereon forming an axially extending central boss at one end thereof surrounded by an annular groove, a collet member comprising a sleeve surrounding said boss and axially slidable in said groove, said groove forming a guideway for said collet member, said boss having a means thereon forming a tapered nose portion, said collet member being axially slotted adjacent said nose portion to form a plurality of spring fingers engaging said nose portion to radially expand and contract the collet in response to axial reciprocation thereof, said body also having a plurality of circumferentially spaced and axially extending bores therein which communicate at one end with said groove, said body having at its other end a central counterbore the diameter of which is such that the other ends of said circumferentially spaced bores open thereinto, a pull-back member in said counterbore and slidable axially therein, means for reciprocating said pull-back member and a plurality of pins axially slidable in said circumferentially spaced bores, said pins being solidly connected at one end with said pull-back member and at their opposite ends with the end portion of said collet member remote from said spring fingers.

8. A collet chuck as called for in claim 7, wherein said first-mentioned means includes a wear ring sleeve fitted over said boss and seated in said groove, said sleeve being solidly connected with said body, the outer end of said sleeve having said nose portion formed thereon.

9. A collet chuck as called for in said claim 8, including a ring member positioned axially adjacent said collet member in said groove, threaded means interconnecting said collet member and said ring member and additional threaded means interconnecting said ring member and said pins.

10. A collet chuck as called for in claim 8, wherein at least some of said spring fingers are formed with an axially extending groove therein on the radially inner side thereof and adjacent their free ends and means on said wear ring engaging said last-mentioned groove and having a driving connection therewith for applying torque directly to the outer end of the collet member when the body is rotated.

11. A collet chuck as called for in claim 10, wherein said last-mentioned means comprise radially extending pins extending into said last-mentioned grooves.

12. A collet chuck as called for in claim 7 including a resilient means interposed between said body and said pull-back member and urging said pull-back member in a direction for expanding the collet member.

13. A collet chuck as called for in claim 7, wherein said resilient means comprises a plurality of compression springs and said means for reciprocating said pull-back member are adapted to compress said springs when the pull-back member is shifted by said reciprocating means in a direction to contract the collet member.

References Cited by the Examiner

UNITED STATES PATENTS 2,824,744  2/58  Peters _____ 279—2
2,893,742  7/59  Frohner _____ 279—2

FOREIGN PATENTS 1,125,545  10/56  France.

ROBERT C. RIORDON, *Primary Examiner.*